Patented Dec. 19, 1950

2,534,236

UNITED STATES PATENT OFFICE 2,534,236

8-HALOXANTHINE SALTS OF DIALKYL-AMINOALKYL o-BENZYLPHENYL ETHERS AND THE PRODUCTION THEREOF

John W. Cusic, Skokie, Ill., assignor to G. D. Searle & Co., Chicago, Ill., a corporation of Illinois No Drawing. Application May 14, 1949, Serial No. 93,415

10 Claims. (Cl. 260—253)

This invention relates to 8-haloxanthine salts of dialkylaminoalkyl o-benzylphenyl ethers. More particularly this invention relates to 8-haloxanthine salts of basic ethers of the general formula

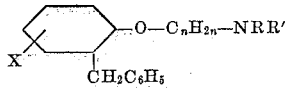

wherein X is hydrogen, halogen or lower alkoxyl, $n$ is an integer from 2 to 5 and R and R' are lower alkyl radicals, and wherein the 8-haloxanthine contains a hydrogen atom in position 7.

This application is a continuation-in-part of my copending application Serial No. 71,763, filed January 19, 1949.

In the foregoing formula, X may represent lower alkoxyl radicals such as methoxyl or ethoxyl groups and halogens such as chlorine, bromine, fluorine or iodine. The bivalent aliphatic hydrocarbon radical represented by $C_nH_{2n}$ may be straight-chained or branched-chained. It includes radicals such as ethylene, propylene and butylene, as well as trimethylene, tetramethylene, and pentamethylene radicals. R and R' represent lower alkyl radicals such as methyl, ethyl, propyl, isopropyl, butyl, and isobutyl.

It is widely recognized that dialkylaminoalkyl o-benzylphenyl ethers elicit certain undesirable side reactions and toxic manifestations. The most common effects are dizziness and sleepiness following the administration of the medication. In certain cases there may be nausea and vomiting. Other effects which have been noticed include weakness, narcolepsy, indigestion, coldness of the extremities, exhaustion, irritability, blurred vision, confusion, and in rare instances collapse. The symptoms produced by dialkylaminoalkyl o-benzylphenyl ethers are often severe enough to warrant reduced dosage or discontinuance of the medication.

It is the object of this invention to produce therapeutic compositions of matter which are relatively free from untoward reactions. A further object is to produce compositions of dialkylaminoalkyl o-benzylphenyl ethers and haloxanthines of reduced toxicity. Another object is to produce compositions having enhanced therapeutic efficacy. Other objects will be apparent to those skilled in the art, in view of the disclosure given herein.

I have discovered that salts of dialkylaminoalkyl o-benzylphenyl ethers with haloxanthines produce little effect on the central nervous system and are therapeutically more useful than any of the individual components alone. The salts of dialkylaminoalkyl o-benzylphenyl ethers and haloxanthines exert a potentiating effect and show enhanced activity in combatting the effects of histamine. As such they are especially useful in the treatment of anaphylaxis and of allergic disorders.

Certain of the compositions within the scope of my invention are so free from undesirable side effects that they may actually be used in suppressing those undesirable symptoms commonly elicited by the usual antihistaminic drugs. For instance, my compounds can be used to prevent or alleviate nausea, motion sickness, dizziness and other distressing reactions.

Among the halogenated xanthines to which this invention pertains are the chloro, bromo, and iodo derivatives of theophylline, and related xanthines which have a hydrogen atom in position 7.

In particular this invention is concerned with acidic xanthines such as 8-chlorotheophylline
8-bromotheophylline
8-chloroxanthine
3-methyl-8-chloroxanthine
8-bromoxanthine
3-methyl-8-bromoxanthine
1,3-diethyl-8-bromoxanthine
1,3-diethyl-8-chloroxanthine
8-iodotheophylline
8-iodo-1,3-diethylxanthine Compositions of dialkylaminoalkyl o-benzylphenyl ethers and haloxanthines are readily prepared by dissolving the base in a suitable solvent and treating the resulting solution with a solution of a halogenated xanthine. Solvents which are satisfactory for this reaction include the lower alcohols and ketones and their mixtures with water, ethers and hydrocarbons. Generally small excesses of the basic ether are desirable in these synthetic procedures. The desired salt generally crystallizes out of the solution on chilling or standing, or may be precipitated by addition of a solvent such as ether or benzene. A simple and efficient alternative method is that of heating together at 50–100° C. equivalent amounts of the liquid basic ether and of the haloxanthine, with good mixing with a small amount of water or alcohol. As the materials react the mixture generally forms a thick paste or granular solid. On chilling the product becomes hard and solid and may be broken up, ground to a powder and dried. The compounds of this invention can also be produced by refluxing a solution of an ammonium salt of a haloxanthine in a lower alcohol or ketone with an equivalent of the basic ether. During the heating, ammonia is evolved and the haloxanthine salt of the dialkylaminoalkyl o-benzylphenyl ether is formed. On chilling this salt precipitates.

The following examples illustrate in more detail my invention, but in no way are to be construed as limiting it in spirit or in scope.

Example 1

A mixture of 102 parts of $\beta$-dimethylaminoethyl o-benzylphenyl ether and 64 parts of 8-chlorotheophylline in 400 parts of methyl ethyl ketone and 40 parts of water is heated to boiling. The resulting boiling solution is decanted from a small amount of 8-chlorotheophylline and evaporated. The residue of the $\beta$-dimethylaminoethyl o-benzylphenyl ether salt of 8-chlorotheophylline crystallizes on standing. After recrystallization from ethyl acetate it melts at 118–119° C.

Example 2

A mixture of 25 parts of $\beta$-dimethylaminoethyl o-benzylphenyl ether and 21 parts of 8-bromotheophylline in 100 parts of methyl ethyl ketone and 10 parts of water is heated to boiling and stirred until the bromotheophylline is substantially completely dissolved. The hot solution is filtered and evaporated. There is thus obtained a residue of the $\beta$-dimethylaminoethyl o-benzylphenyl ether salt of 8-bromotheophylline as an oily, light-colored residue.

I claim:

1. An 8-haloxanthine salt of a basic ether of the formula

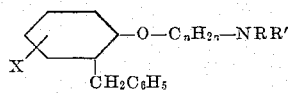

wherein X is a member of the group consisting of hydrogen, halogen and lower alkoxyl radicals, $n$ is an integer from 2 to 5 and R and R' are lower alkyl radicals, and wherein the 8-haloxanthine contains a hydrogen atom in position 7.

2. An 8-haloxanthine salt of a basic ether of the formula

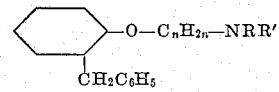

wherein $n$ is an integer from 2 to 5 and R and R' are lower alkyl radicals, and wherein the 8-haloxanthine contains a hydrogen atom in position 7.

3. An 8-haloxanthine salt of a basic ether of the formula

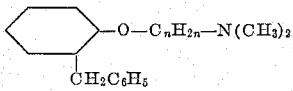

wherein $n$ is an integer from 2 to 5, and wherein the 8-haloxanthine contains a hydrogen atom in position 7.

4. An 8-halotheophylline salt of a basic ether as in claim 3.

5. An 8-chlorotheophylline salt of a basic ether as in claim 3.

6. An 8-bromotheophylline salt of a basic ether as in claim 3.

7. The 8-chlorotheophylline salt of $\beta$-dimethylaminoethyl o-benzylphenyl ether.

8. The 8-bromotheophylline salt of $\beta$-dimethylaminoethyl o-benzylphenyl ether.

9. The process of producing a haloxanthine salt of a dialkylaminoalkyl o-benzylphenyl ether which comprises reacting one equivalent of an 8-haloxanthine which contains a hydrogen atom in position 7 with one equivalent of a dialkylaminoalkyl o-benzylphenyl ether in an inert, water-soluble solvent and separating the salt thus formed.

10. The process of producing the 8-chlorotheophylline salt of $\beta$-dimethylaminoethyl o-benzylphenyl ether which comprises reacting one equivalent of $\beta$-dimethylaminoethyl o-benzylphenyl ether with one equivalent of 8-chlorotheophylline in aqueous methyl ethyl ketone and separating the salt thus formed.

JOHN W. CUSIC.

REFERENCES CITED

The following references are of record in the file of this patent:

Huttrer: Enzymologia (Acta Biocatalytica) 12, 327 (1948).